(12) United States Patent
Rablau

(10) Patent No.: US 9,976,919 B2
(45) Date of Patent: May 22, 2018

(54) FIBER-OPTIC SENSOR ASSEMBLY

(71) Applicant: Kettering University, Flint, MI (US)

(72) Inventor: Corneliu Ioan Rablau, Grand Blanc, MI (US)

(73) Assignee: KETTERING UNIVERSITY, Flint, MI (US)

( * ) Notice: Subject to any disclaimer, the term of this patent is extended or adjusted under 35 U.S.C. 154(b) by 208 days.

(21) Appl. No.: 15/076,286

(22) Filed: Mar. 21, 2016

(65) Prior Publication Data

US 2016/0282207 A1    Sep. 29, 2016

Related U.S. Application Data

(60) Provisional application No. 62/139,188, filed on Mar. 27, 2015.

(51) Int. Cl.
    *G01L 1/24*    (2006.01)
    *G01P 15/093*    (2006.01)

(52) U.S. Cl.
    CPC .......... *G01L 1/242* (2013.01); *G01P 15/093* (2013.01)

(58) Field of Classification Search
    None
    See application file for complete search history.

(56) References Cited

U.S. PATENT DOCUMENTS

| | | |
|---|---|---|
| 4,670,649 A | 6/1987 | Senior et al. |
| 4,897,542 A * | 1/1990 | Dakin ............ G01D 5/268 250/227.21 |
| 5,001,338 A | 3/1991 | Boero |
| 5,359,445 A * | 10/1994 | Robertson ............ G01D 5/268 250/227.14 |

(Continued)

FOREIGN PATENT DOCUMENTS

| | | |
|---|---|---|
| EP | 0167220 A1 | 1/1986 |
| EP | 0828174 A2 | 3/1998 |

OTHER PUBLICATIONS

Application of Biomedical Engineering in Force and Tactile Sensing for Robotic MIS, by Sweta Gupta of University of Califonia Irvine.

(Continued)

*Primary Examiner* — Lisa Caputo
*Assistant Examiner* — Nathaniel T Woodward
(74) *Attorney, Agent, or Firm* — Dickinson Wright PLLC

(57) ABSTRACT

A fiber-optic force and displacement sensor includes a mirror comprising a plurality of sectors extending from a center point to a peripheral edge. Each of the sectors has a high reflectance corresponding to only one of a plurality of single wavelength light beams having different wavelengths transmitted from a laser light source. A method of measuring force and displacement includes measuring the radiant flux between each of a plurality of reflected single wavelength light beams that change as the area of the sectors are displaced towards and away from a center of projection of a combination light beam that comprises the plurality of single wavelength light beams projected towards the center point of the mirror when the mirror is in a rested position. Forces acting upon the mirror are measured as a function of the displacement of the mirror and the transverse and the axial stiffness of a connector.

20 Claims, 4 Drawing Sheets

(56) References Cited

U.S. PATENT DOCUMENTS

| | | | | |
|---|---|---|---|---|
| 5,425,179 | A * | 6/1995 | Nickel | G01C 9/20 |
| | | | | 33/366.16 |
| H1813 | H * | 11/1999 | Kersey | 372/20 |
| 6,674,928 | B2 * | 1/2004 | Johnson | G01D 5/35383 |
| | | | | 374/E11.016 |
| 6,775,478 | B2 | 8/2004 | Suzuki et al. | |
| 7,038,793 | B2 | 5/2006 | Schick | |
| 7,502,120 | B2 | 3/2009 | Menezo | |
| 8,620,120 | B2 * | 12/2013 | Baets | G01D 5/268 |
| | | | | 385/14 |
| 8,705,902 | B2 | 4/2014 | Cranch | |
| 8,879,067 | B2 | 11/2014 | Higgins et al. | |
| 9,052,775 | B1 * | 6/2015 | Salisbury | G01L 5/226 |
| 9,753,055 | B2 * | 9/2017 | Paquet | G01P 15/093 |
| 2012/0050735 | A1 * | 3/2012 | Higgins | G01L 1/24 |
| | | | | 356/326 |

OTHER PUBLICATIONS

A Micro Optical Force Sensor for Force Feedback during Minimally Invasive Robotic Surgery, by Peirs et al.
Circular Variable Filter, CI-Systems.
Fibre-Optics, IG London.
Near-infrared Diode Laser Spectroscopy in Chemical Process and Environmental Air Monitoring, by Philip A. Martin for Chemical Society Reviews Issue 4, 2002.

* cited by examiner

FIBER-OPTIC SENSOR ASSEMBLY

CROSS REFERENCE TO RELATED APPLICATION

This application claims the benefit of provisional application with a Ser. No. 62/139,188 filed Mar. 27, 2015.

BACKGROUND OF THE INVENTION

1. Field of the Invention

The present invention relates to a fiber-optic sensor assembly and a method for sensing force and displacement.

2. Description of the Prior Art

There have been various attempts to create a durable, inexpensive, fiber-optic force and displacement sensor. One such sensor is known as the Fiber Bragg grating sensor (FBG) that utilizes various changes in the refractive index of a fiber core in a fiber-optic cable to measure force and pressure. However, the FBG and other similar sensors that use alternating layers with different refractive indexes suffer from common drawbacks such as weak and brittle axial tensile strength and temperature dependency. Another such sensor is disclosed in U.S. Pat. No. 8,879,067 (hereinafter the '067 Patent) that utilizes a wavelength dependent sensor that reflects or transmits a wavelength-specific spectral feature. The '067 Patent discloses using a laser light source to produce a plurality of single wavelength light beams in electromagnetic communication with a two-way fiber-optic cable. The two-way fiber-optic cable extends to a distal end for discharging the combination light beam. A collimating lens is spaced from the distal end at a first distance. A wavelength sensitive element is spaced from the collimating lens a second distance. The '067 Patent assembly is wavelength dependent and thus measures displacement as a function of the change of wavelength. With advances in technology, there exists an opportunity to create a sensor that is intensity dependent and not wavelength dependent.

SUMMARY OF THE INVENTION

The invention provides for a fiber-optic sensor and method utilizing a mirror that includes a plurality of sectors extending from a center point of the minor to a peripheral edge of the mirror. Each of the sectors of the mirror have a reflectance (also known as reflectivity) corresponding to one of a plurality of single wavelength light beams transmitted from a laser light source for calculating force and displacement. The plurality of single wavelength light beams is projected onto the mirror about a center of projection. Displacement is calculated as a function of the change of radiant flux between each of the single wavelength light beams reflected from the mirror as the area of each of the sectors are displaced towards and away from the center of projection. Therefore, both the fiber-optic sensor and method are intensity dependent under wavelength interrogation.

ADVANTAGES OF THE INVENTION

The present invention overcomes the shortcomings of measuring force and displacement at the end of a fiber-optic cable.

The present invention provides for a fiber-optic sensor with improved capabilities of measuring force in displacement along three degrees of applied force by using a mirror comprising a plurality of sectors each having different reflective properties.

The present invention further provides for an improved method of measuring force and displacement along three degrees of applied force with a fiber-optic sensor using a mirror comprising a plurality of sectors each having different reflective properties.

BRIEF DESCRIPTION OF THE DRAWINGS

Other advantages of the present invention will be readily appreciated, as the same becomes better understood by reference to the following detailed description when considered in connection with the accompanying drawings pertaining to a preferred embodiment of the sensor using a four-sector minor wherein.

DESCRIPTION OF THE ENABLING EMBODIMENT

Figure 1:
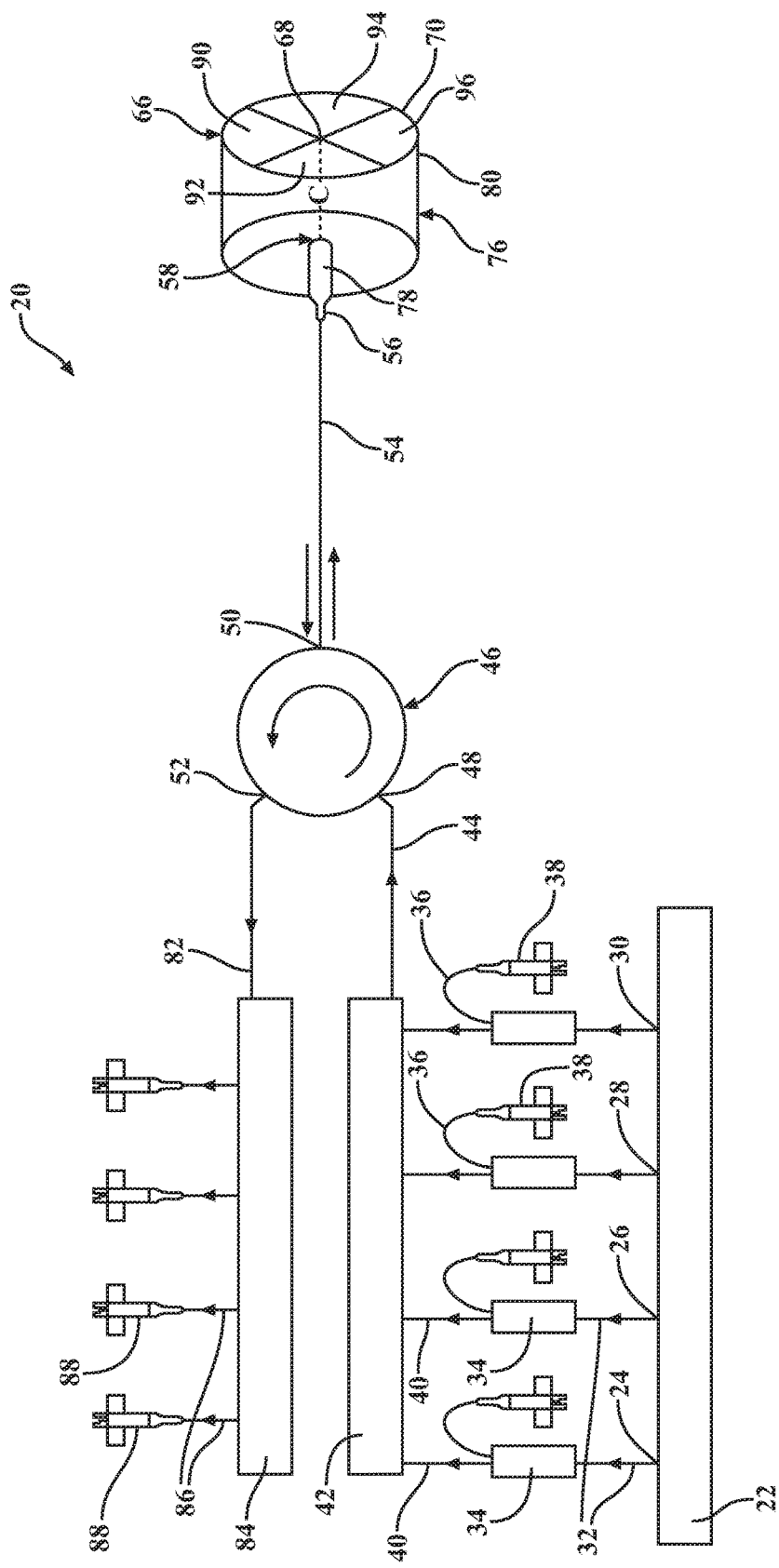
FIG. 1 is a schematic top view of the fiber-optic assembly.
Figure 2:
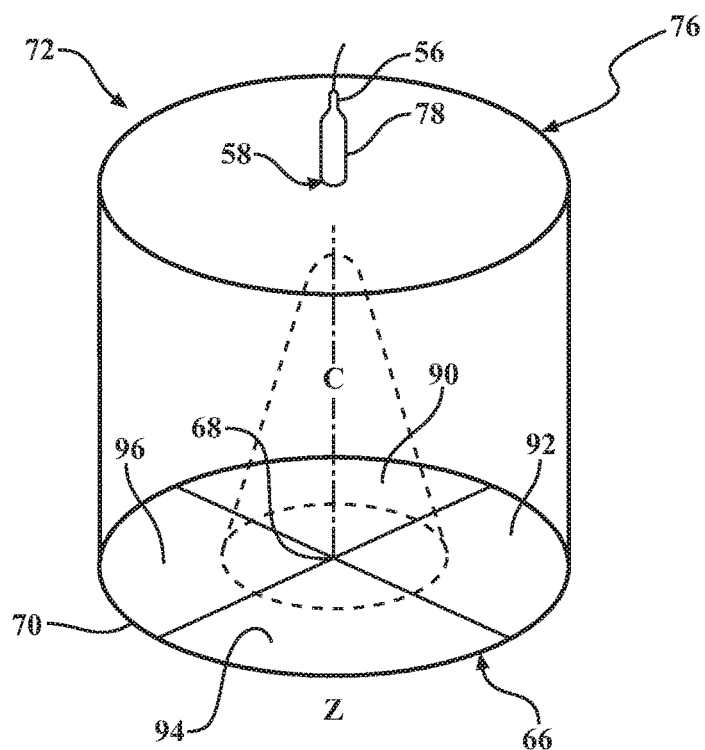
FIG. 2 is a perspective view of the mirror in the rested position.
Figure 3:
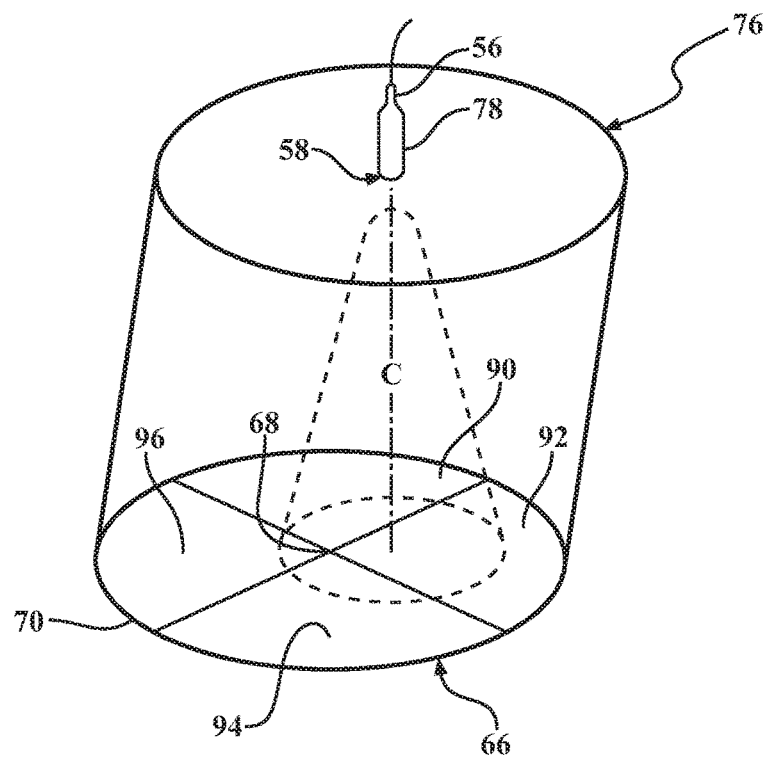
FIG. 3 is a perspective view of the displaced mirror.
Figure 4:
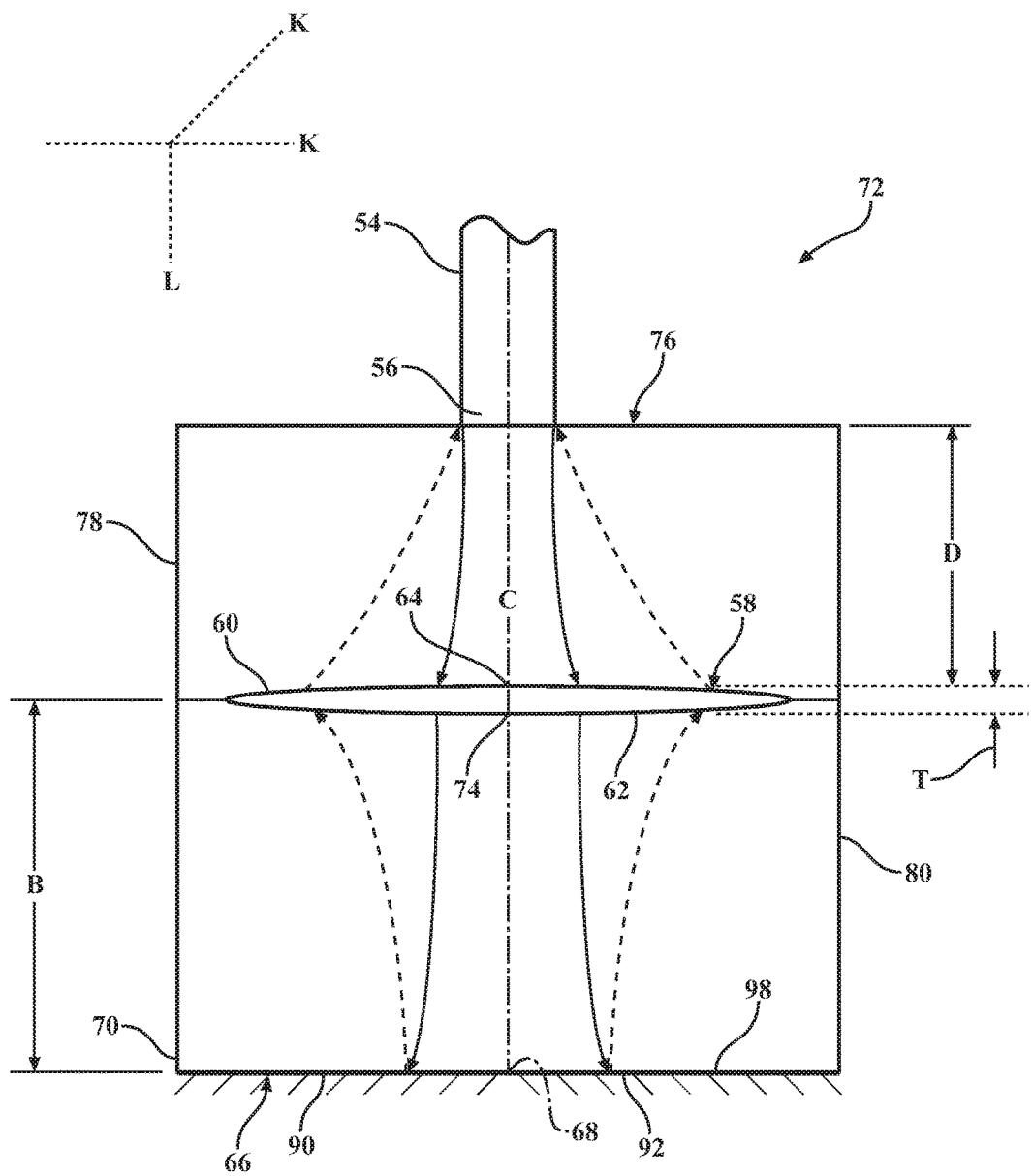
FIG. 4 is a cross-sectional view of the connector showing the reflected combination light beam entering the collimating lens and reflecting off the mirror.

Referring to the Figures, wherein like numerals indicate corresponding parts throughout the several views, the present invention relates to a fiber-optic sensor assembly 20, generally shown in FIG. 1, for sensing force and displacement at the end of a fiber-optic cable.

The assembly includes a laser light source 22 that has a plurality of channels (24, 26, 28, 30) with each of the channels (24, 26, 28, 30) producing a single wavelength light beam having a different wavelength. In the preferred embodiment, the plurality of channels (24, 26, 28, 30) each produce a light beam having a different wavelength that includes a first channel 24 that produces a light beam having a wavelength $\lambda_1$. A second channel 26 that produces a light beam having a wavelength $\lambda_2$. A third channel 28 that produces a light beam having a wavelength $\lambda_3$. A fourth channel 30 for producing a light beam having a wavelength $\lambda_4$. It should be appreciated that in one embodiment each of the single wavelength light beams have a wavelength between 1529 nm and 1562 nm. It should also be appreciated that the laser light source 22 could produce more than one single wavelength light beam having the same wavelength so long as the laser light source 22 produces a plurality of wavelengths in total.

First fiber-optic cables 32 are connected and paired to each of the channels (24, 26, 28, 30) for transmitting one of the single wavelength light beams from the laser light source 22 through the first fiber-optic cables 32. A plurality of power splitters 34 each include an input a first output and a second output. Each input is connected and paired to one of the first fiber-optic cables 32 for dividing the single wavelength light beams into predefined fractions.

First division fiber-optic cables 36 are connected and paired to the first output of a power splitter 34 for transmitting the predefined fraction of the single wavelength beam to one of a plurality of first photodiodes 38. The first photodiodes 38 are used for measuring and monitoring the radiant flux of the predefined fraction of the single wavelength light beam by converting the measurement of intensity into a current. Accordingly, the overall radiant flux can be determined by dividing the radiant flux of the predefined fraction of each single wavelength light beam by the predefined fraction and aggregating the totals.

Second division fiber-optic cables 40 are connected and paired to the second output of each of the power splitters 34 for transferring the remainder of the single wavelength light beam to a wavelength division multiplexer 42. The wavelength division multiplexer 42 is in electromagnetic communication with the laser light source 22 through the plurality of first fiber-optic cables 32 and the plurality of second division fiber-optic cables 40 for combining the remaining fraction of each of the single wavelength light beams into a combination light beam, comprising the single wavelength light beams having wavelengths $\lambda_1$, $\lambda_2$, $\lambda_3$, and $\lambda_4$. An input fiber-optic cable 44 is connected to the wavelength division multiplexer 42 for transmitting the combination light beam to a circulator 46, generally indicated in FIG. 1, that includes a first port 48, a second port 50, and a third port 52. The first port 48 is connected to the input fiber-optic cable 44 for receiving the combination light beam and transmitting the combination light beam to the second port 50. It should also be appreciated that the laser light source 22, by itself, could produce the combination light beam comprising a plurality of single wavelength light beams at predefined intensities into one or more fiber-optic cables.

A two-way fiber-optic cable 54 is in electromagnetic communication with the laser light source 22 and extends from the second port 50 to a distal end 56. The two-way fiber-optic cable 54 defines an outward direction from the second port 50 to the distal end 56 and an inward direction from the distal end 56 to the second port 50 for transmitting the combination light beam between the circulator 46 and the distal end 56. The distal end 56 of the two-way fiber-optic cable 54 discharges the combination light beam that includes each of the single wavelength light beams about a center of projection C.

A collimating lens 58, generally indicated in FIGS. 1, 2, 3, and 4, is spaced from the distal end 56 along the center of projection C at a first distance D. The collimating lens 58 comprises a first side 60 spaced from a second side 62 defining a thickness T with the first side 60 facing towards from the distal end 56 and the second side 62 facing away from the distal end 56. The first side 60 of the collimating lens 58 defines a first radius of curvature 64 for receiving the combination light beam. The collimating lens aligns the combination light beam into a parallel relationship about the center of projection C and casts the combination light beam entering from the first side 60 of the collimating lens 58. It should be noted that the projection of the combination light beam exiting the collimating lens 58, towards the mirror ideally has a Gaussian profile. Additionally, it should be appreciated that the collimating lens 58 could be spherical or non-spherical, i.e., aspheric.

A mirror 66, generally indicated in FIGS. 1, 2, 3, and 4, includes a center point 68 that extends to a peripheral edge 70 to define a circular shape. The mirror 66 is spaced along the center of projection C from the collimating lens 58 a second distance B when the mirror 66 is in a rested position 72. The center point 68 of the minor 66 receives the center of projection C of the combination light beam from the collimating lens 58. The mirror 66 reflects a larger fraction of the combination light beam back onto the collimating lens 58 as the mirror 66 is displaced from the rested position 72 towards the collimating lens 58 along the center of projection C. The second side 62 of the collimating lens 58 has a second radius of curvature 74 and the collimating lens 58 includes a focal point at the first distance D along the center of projection C. Accordingly, the collimating lens 58 focuses the reflected combination light beam into the distal end 56 of the two-way fiber-optic cable 54 in the inward direction back to the second port 50.

A connector 76, generally indicated in FIGS. 1, 2, 3, and 4, comprises material non-reflective to the combination light beam and includes a rigid portion 78 and a flexible portion 80. The rigid portion 78 statically connects the distal end 56 of the two-way fiber-optic cable 54 to the collimating lens 58 and the flexible portion 80 elastically connects the collimating lens 58 to the minor 66 and biases the mirror 66 in the rested position 72. The flexible portion 80 of the connector 76 has a defined transverse stiffness K in a first dimension of applied force X and a second dimension of applied force Y and a defined axial stiffness L in a third dimension of applied force Z for allowing deformation of the flexible portion 80. Accordingly, when outside forces act upon the mirror 66 the flexible portion 80 of the connector 76 is deformed and changes the alignment of the mirror 66 with the center of projection C. As the alignment of the mirror 66 changes with respect to the center of projection C, the fraction of the combination light beam that is reflected back to the two-way fiber-optic cable 54 through the collimating lens 58 changes. It should be appreciated that the transverse stiffness could be different in a first dimension of applied force X and a second dimension of applied force Y. It should also be appreciated that the connector 76 could be deformable in any number of dimensions of applied force. In an additional embodiment, the connector 76 defines a hermetically sealed cavity for housing the distal 56 end of the two-way fiber optic cable 54, the collimating lens 58, and the mirror 66.

A reflected light fiber-optic cable 82 extends from the third port 52 of the circulator 46. The reflected light fiber-optic cable 82 transmits the reflected combination light beam traveling from the two-way fiber-optic cable 54 in the inward direction through the second port 50 to an array waveguide grating demultiplexer 84. The array waveguide grating demultiplexer 84 is in electromagnetic communication with the circulator 46 through the reflected light fiber-optic cable 82 and separates the reflected combination light beam back into the single wavelength light beams.

A plurality of second fiber-optic cables 86 extends from the array waveguide grating demultiplexer 84 with each of the second fiber-optic cables 86 transmitting one of the single wavelength light beams from the array waveguide grating demultiplexer 84 to a plurality of final photodiodes 88. The plurality of final photodiodes 88 are in electromagnetic communication with the array waveguide grating demultiplexer 84 with each of the final photodiodes 88 connected and paired to one of the second fiber-optic cables 86. The final photodiodes 88 are used for measuring and converting the radiant flux of the single wavelength light beams into a current that can be aggregated into a combined measurement. The current can be used for calculating displacement along the third dimension of applied force Z as a function of the change of radiant flux between the first photodiode 38 and the final photodiode 88. However, it should also be appreciated that the first photodiodes 38 and the final photodiodes 88 could be any type of photodetectors. The radiant flux increases in proportion as the mirror 66 is displaced from the rested position 72 towards the collimating lens 58 thereby reflecting more of the reflected combination light beam back into the collimating lens 58.

The mirror 66 includes a plurality of sectors (90, 92, 94, 96) that extends from the center point 68 to the peripheral edge 70. Each of the sectors (90, 92, 94, 96) are equal in size and shape and define an equal ratio of the mirror 66 for reflecting an equal amount of the projection of the combination light beam when the mirror 66 is in the rested position 72. Furthermore, each of the sectors (90, 92, 94, 96) of the mirror 66 has a different reflectance (also known as reflectivity). It should be appreciated that each of the sectors (90, 92, 94, 96) of the mirror 66 may comprise a substrate and at least one layer of optical coating 98. The optical coating 98 on each sector (90, 92, 94, 96) has a reflectance corresponding to one of the single wavelength light beams transmitted from the laser light source 22. Therefore, each sector reflects only that one of the single wavelength light beams in the combination light beam that has a matched wavelength to the reflectance of the optical coating 98. It should also be appreciated that the mirror 66 could be a dichroic mirror 66 with sectors (90, 92, 94, 96).

The plurality of final photodiodes 88 can then receive and measure the radiant flux of each one of the single wavelength light beams, individually. The radiant flux measurements can then be used to calculate the transverse displacement along the first dimension of applied force X, the second dimension of applied force Y, and the third dimension of applied force Z. The calculation is a function of the radiant flux between each of the single wavelength light beams changing as the area of each of the sectors (90, 92, 94, 96) are displaced towards and away from the center of projection C by elastic deformation of the flexible portion 80 of the connector 76. In addition, forces acting upon the mirror 66 are also calculable as a function of the displacement of the mirror 66 and the transverse stiffness K and the axial stiffness L. It should be appreciated that these measurements can be made through calibration or any mathematical principles such as but not limited to matrix force methods, intensity distribution in view of the Gaussian propagation, or the ratio of reflection in view of the geometric characteristics of the sectors (90, 92, 94, 96).

In a preferred embodiment, the plurality of sectors (90, 92, 94, 96) further comprise a first sector 90 that has a high reflectance only for the light beam having a wavelength $\lambda_1$ from the first channel 24 of the laser light source 22. A second sector 92 that has a high reflectance only for the light beam having a wavelength $\lambda_2$ from the second channel 26 of the laser light source 22. A third sector 94 having a high reflectance only for the light beam that has a wavelength $\lambda_3$ from the third channel 28 of the laser light source 22. A forth sector 96 that has a high reflectance only for the light beam having a wavelength $\lambda_4$ from the forth channel of the laser light source 22. However, it should be appreciated that there could be any number of sectors (90, 92, 94, 96) defining the mirror 66. It should be reiterated that in one embodiment each of the single wavelength light beams produced have a wavelength between 1529 nm and 1562 nm.

Figure 5:
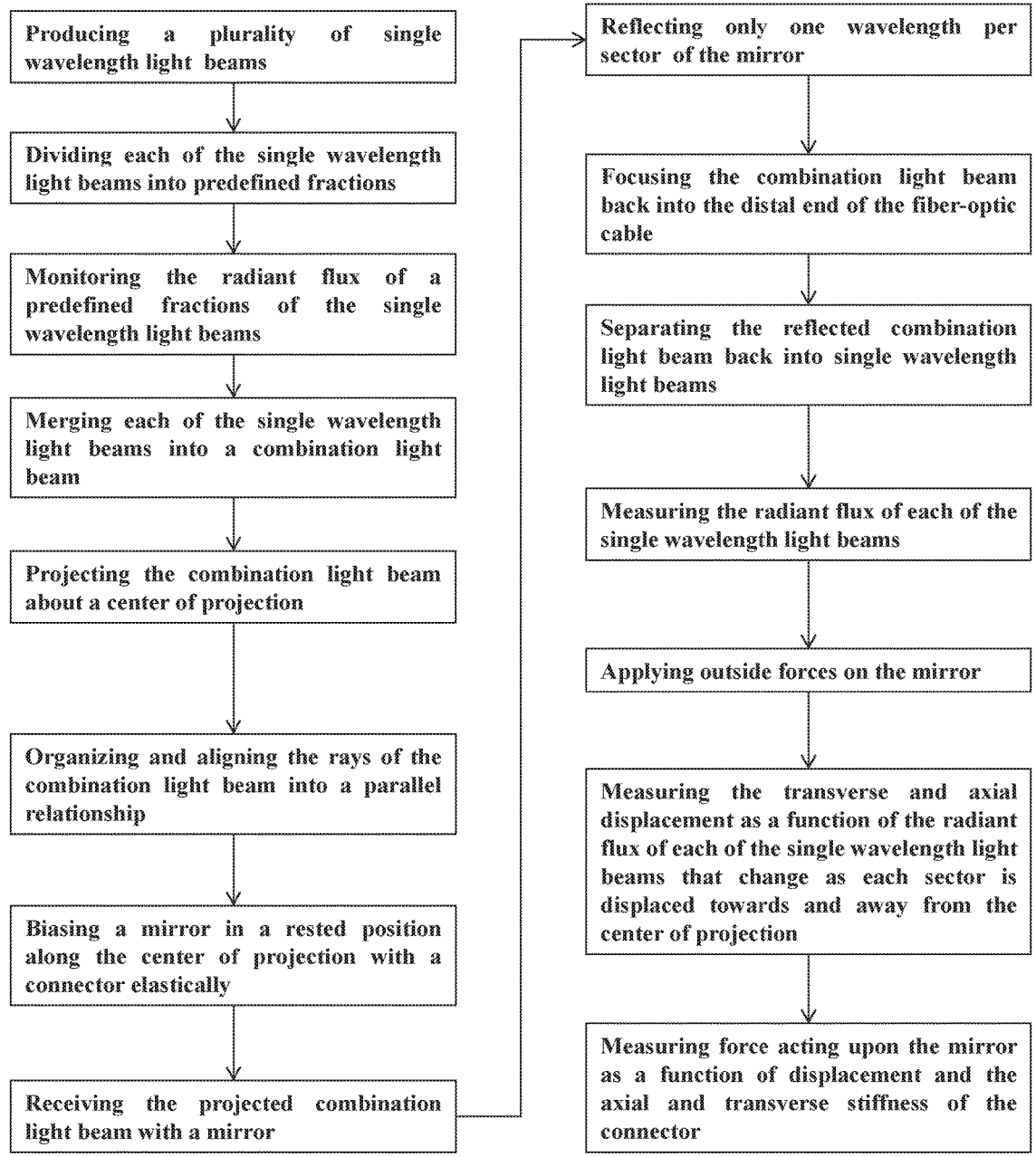
FIG. 5 is a flow chart of the method described herein.

It is another aspect of the present invention to provide a method for measuring force and displacement of a fiber-optic sensor 20, shown in FIG. 5. Where the fiber-optic sensor 20 comprises a mirror 66 with a plurality of sectors (90, 92, 94, 96) extending from a center point 68 to a peripheral edge 70. Each of the sectors (90, 92, 94, 96) have a different reflectance. The mirror 66 is biased in a rested position 72 along a center of projection C of a combination light beam by a connector 76 having a flexible portion 80. The first step begins with producing a plurality of single wavelength light beams with a laser light source 22 with each of the single wavelength light beams having a different wavelength. In a preferred embodiment the step of producing a plurality of single wavelength light beams at different wavelengths includes producing four light single wavelength light beams. A first light beam having a wavelength $\lambda_1$, a second light beam having a wavelength $\lambda_2$, a third light beam having a wavelength $\lambda_3$, and a forth light beam having a wavelength $\lambda_4$. It should also be appreciated that the laser light source 22 could produce more than one single wavelength light beam having the same wavelength so long as the laser light source 22 produces a plurality of wavelengths in total.

The method further includes a step of dividing each of the single wavelength light beams with a power splitter 34 into a predefined first fraction of the single wavelength light beam and a predefined second fraction of the single wavelength light beam. Next a measurement of the radiant flux of the first fraction of each of the single wavelength light beams is taken. The step of monitoring the radiant flux of the first fraction of each of the single wavelength light beams further includes converting the radiant flux into a current with a first photodiode 38 which could include any type of photodetector. The next step includes merging each of the second fractions of the single wavelength light beams into a combination light beam with a multiplexor 42. It should also be appreciated that the laser light source 22 could itself produce the combination light beam comprising a plurality of single wavelength light beams at predefined intensities.

The step of creating the combination light beam is followed by transmitting the combination light beam to a circulator 46 that includes a first port 48, a second port 50, and a third port 52. Next, the combination light beam is directed from the first port 48 to the second port 50 of the circulator 46 and transmitted from the second port 50 of the circulator 46 along a two-way fiber-optic cable 54 that extends from the second port 50 to a distal end 56.

The next step of the method is projecting the combination light beam that includes each single wavelength light beam from the distal end 56 about a center of projection C to a collimating lens 58 that is spaced from the distal end 56 a first distance D. Then, rays of the combination light beam are organized and aligned into a parallel relationship with the collimating lens 58 and cast onto a mirror 66 with the collimating lens 58. The mirror 66 includes a center point 68 extending to a peripheral edge 70 defining a circular shape. The mirror 66 is spaced along the center of projection C from the collimating lens 58 a second distance B when the mirror 66 is in a rested position 72.

Next, the mirror 66 is biased in the rested position 72 with a connector 76 that comprises material non-reflective to the combination light beam. The connector 76 includes a rigid portion 78 and a flexible portion 80. The rigid portion 78 statically connects the distal end 56 of the two-way fiber-optic cable 54 to the collimating lens 58. The flexible portion 80 elastically connects the collimating lens 58 to the mirror 66.

It should be appreciated that the step of biasing the mirror 66 may further include applying outside forces on the flexible portion 80 of the connector 76. Where the connector 76 has a transverse stiffness K in a first dimension of applied force X, a second dimension of applied force Y, and a axial stiffness L in a third dimension of applied force Z allowing deformation of the flexible portion 80. Deformation of the flexible portion 80 changes the alignment of the mirror 66 with the center of projection C and in response changes the fraction of the combination light beam reflected back to the two-way fiber-optic cable 54 through the collimating lens 58.

The next step includes receiving and returning the reflected combination light beam from the mirror 66 back to the collimating lens 58. The mirror 66 reflects a larger fraction of the combination light beam back onto the collimating lens (58) as the mirror 66 moves closer to the collimating lens 58 by deformation of the flexible portion 80 of the connector 76. It should be appreciated that the step of returning the reflected combination light beam may further include focusing the reflected combination light beam along the center of projection C back into the distal end 56 of the two-way fiber-optic cable 54 with the collimating lens 58.

Next, the reflected combination light beam is transmitted back through the second port 50 of the circulator 46 and directed to the third port 52 of the circulator 46. Then the reflected combination light beam is transmitted from the third port 52 of the circulator 46 to an array waveguide grating demultiplexor 84 in order to separate the reflected combination light beam back into separate single wavelength light beams. The next step includes measuring the radiant flux of each of the single wavelength light beams. It should be appreciated that the step of measuring the radiant flux of single wavelength light beams may further include converting the radiant flux of each single wavelength light beam into a current with a plurality of final photodiodes 88 and aggregating each current.

The next step includes measuring the displacement of the mirror along the third dimension of applied force Z. The measurement is a function of the change of radiant flux between the aggregated single wavelength light beams from the laser light source 22 and the aggregated reflected single wavelength light beams that increase in proportion as the mirror 66 is displaced from the rested position 72. When the mirror 66 is displaced towards the collimating lens 58 it reflects more of the reflected combination light beam back into the collimating lens 58. It should be appreciated that the displacement may be measured along the third dimension of applied force Z by measuring and monitoring the radiant flux from the first photodiode 38 and measuring the radiant flux from the final photodiode 88 and comparing the two measurements.

The step of receiving and returning the reflected combination light beam from the mirror 66 back to the collimating lens 58 further includes reflecting only one wavelength of the combination light beam per sector (90, 92, 94, 96) of the mirror 66 that extend to the peripheral edge 70. The preceding step further includes reflecting equal portions of the combination light beam from the mirror 66 with each sector (90, 92, 94, 96) of the mirror 66 when the mirror 66 is in the rested position 72.

It should be appreciated that the step of reflecting only one wavelength with each sector of (90, 92, 94, 96) of the mirror 66 may also include reflecting the first light beam having wavelength $\lambda_1$ with a first sector 90. Reflecting the second light beam having a wavelength $\lambda_2$ with a second sector 92. Reflecting the third light beam having a wavelength $\lambda_3$ with a third sector 94. Reflecting the forth light beam having a wavelength $\lambda_4$ with a forth sector 96. It should also be appreciated that the mirror 66 could be a dichroic mirror 66 with sectors (90, 92, 94, 96), The next step includes receiving and measuring the radiant flux of each one of the single wavelength light beams, individually. Then, measuring the displacement of the mirror (66) by measuring the transverse displacement along the first dimension of applied force X and the second dimension of applied force V as a function of the change radiant flux between each of the single wavelength light beams. The radiant flux between each of the single wavelength light beams changes as the area of each of the sectors (90, 92, 94, 96) are displaced towards and away from the center of projection C. The displacement occurs by deformation of the flexible portion 80 of the connector CO in the first dimension of applied force X and the second dimension of applied force Y. Then, measuring a force acting upon the mirror 66 becomes a function of the displacement of the mirror 66 and the transverse stiffness K and the axial stiffness L. It should be appreciated that these measurements can be made through calibration or any mathematical principles such as but not limited to matrix force methods, intensity distribution in view of the Gaussian propagation, or the ratio of reflection in view of the geometric characteristics of the sectors (90, 92, 94, 96).

In operation, the fiber-optic sensor assembly 20 and the method of measuring force and displacement have multiple applications and can be used wherever a force or displacement sensor is needed, particularly in applications that require sensors that can operate free of electronic or magnetic interference. In one example, the fiber-optic sensor assembly 20 can be utilized in both robotic and non-robotic laparoscopic surgery.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A fiber-optic sensor assembly (20) for sensing force and displacement at an end of a fiber-optic cable comprising;

a laser light source (22) producing a plurality of single wavelength light beams having different wavelengths, a two-way fiber-optic cable (54) in electromagnetic communication with said laser light source (22) extending to a distal end (56) for discharging a combination light beam including each of the single wavelength light beams about a center of a projection C, a collimating lens (58) spaced from said distal end (56) along said center of projection C at a first distance D, a mirror (66) including a center point (68) extending to a peripheral edge (70) being spaced along said center of projection C from said collimating lens (58) a second distance B when said mirror (66) being in a rested position (72), a connector (76) elastically connecting said collimating lens (58) directly to said mirror (66) and biasing said mirror (66) in said rested position (72), and characterized by, said mirror (66) including a plurality of sectors (90, 92, 94, 96) extending from said center point (68) to said peripheral edge (70), each of said sectors (90, 92, 94, 96) of said mirror (66) having a high reflectance corresponding to one of the single wavelength light beams transmitted from said laser light source (22) for calculating the transverse displacement as a function of the change of radiant flux between each of the single wavelength light beams reflected from said mirror (66) as each of said sectors (90, 92, 96) are displaced by elastic deformation of said connector (76).

2. An assembly as set forth in claim 1 further including each of said sectors (90, 92, 94, 96) being equal in size and shape and defining an equal ratio of said mirror (66) for reflecting an equal amount of the combination light beam when said mirror (66) being in said rested position (72).

3. An assembly as set forth in claim 2 further including said peripheral edge (70) of said mirror (66) defining a circular shape reflecting a larger fraction of the combination light beam projected with a Gaussian profile back to said collimating lens (58) as said mirror (66) being displaced from said rested position (72) towards said collimating lens (58) along the center of projection C.

4. An assembly as set forth in claim 3 further including said plurality of channels (24, 26, 28, 30) each producing a light beam having a different wavelength including a first channel (24) for producing a light beam having a wavelength $\lambda_1$, a second channel (26) for producing a light beam having a wavelength $\lambda_2$, a third channel (28) for producing a light beam having a wavelength $\lambda_3$, and a fourth channel (30) for producing a light beam having a wavelength $\lambda_4$.

5. An assembly as set forth in claim 4 further including said plurality of sectors (90, 92, 94, 96) further comprising a first sector (90) having a high reflectance only for the light beam having a wavelength $\lambda_1$ from said first channel (24) of said laser light source (22) and a second sector (92) having a high reflectance only for the light beam having a wavelength $\lambda_2$ from said second channel (26) of said laser light source (22) and a third sector (94) having a high reflectance only for the light beam having a wavelength $\lambda_3$ from said third channel (28) of said laser light source (22) and a forth sector (96) having a high reflectance only for the light beam having a wavelength $\lambda_4$ from said forth channel of said laser light source (22).

6. An assembly as set forth in claim 1 where said mirror (66) being a dichroic mirror (66).

7. An assembly as set forth in claim 1 including an array waveguide grating demultiplexer (84) for separating the reflected combination light beam back into the single wavelength light beams for measuring the radiant flux of each single wavelength light beams reflected from said mirror (66).

8. An assembly as set forth in claim 7 further including said flexible portion (80) of said connector (76) having a defined transverse stiffness K in a first dimension of applied force X and a second dimension of applied force Y and a defined axial stiffness L in a third dimension of applied force Z for allowing deformation of said flexible portion (80) and outside forces acting upon said mirror (66) deforming said flexible portion (80) of said connector (76).

9. An assembly as set forth in claim 8 further including each of said sectors (90, 92, 94, 96) of said mirror (66) comprising a substrate and at least one layer of optical coating (98) having a reflectance corresponding to one of the single wavelength light beams transmitted from said laser light source (22) for reflecting only single wavelength light beams in the combination light beam having a matched wavelength to the reflectance for measuring the radiant flux of each one of the single wavelength light beams and calculating the transverse displacement along said first dimension of applied force X and said second dimension of applied force Y and said third dimension of applied force Z as a function of the change of the radiant flux between each of the single wavelength light beams changing as the area of each of said sectors (90, 92, 94, 96) are displaced towards and away from said center of projection C by elastic deformation of said flexible portion (80) of said connector (76) and forces acting upon said mirror (66) become a function of the displacement of said mirror (66) and said transverse stiffness K and said axial stiffness L.

10. A fiber-optic sensor assembly (20) for sensing force and displacement at an end of a fiber-optic cable comprising;
a laser light source (22) including a plurality of channels (24, 26, 28, 30) with each of said channels (24, 26, 28, 30) producing a plurality of single wavelength light beams having different wavelengths,
said plurality of channels (24, 26, 28, 30) each producing a light beam having a different wavelength including a first channel (24) for producing a light beam having a wavelength $\lambda_1$, a second channel (26) for producing a light beam having a wavelength $\lambda_2$, a third channel (28) for producing a light beam having a wavelength $\lambda_3$, and a fourth channel (30) for producing a light beam having a wavelength $\lambda_4$,
a plurality of first fiber-optic cables (32) with each of said first fiber-optic cables (32) connected and paired to one of said channels (24, 26, 28, 30) for transmitting one of the single wavelength light beams from said laser light source (22) through said first fiber-optic cables (32),
a plurality of power splitters (34) with each of said power splitters (34) including an input a first output and a second output and said input being connected and paired to one of said first fiber-optic cables (32) for dividing the single wavelength light beams into predefined fractions,
a plurality of first division fiber-optic cables (36) with each of said first division fiber-optic cables (36) connected and paired to said first output of one of said power splitters (34) for transmitting the predefined fraction of the single wavelength light beam,
a plurality of first photodiodes (38) with each of said first photodiodes (38) connected and paired to one of said first division fiber-optic cables (36) for measuring the radiant flux of the predefined fraction of the single wavelength light beam by converting the measurement of intensity into a current,
a plurality of second division fiber-optic cables (40) with each of said second division fiber-optic cables (40) connected and paired to said second output of one of said power splitters (34) for transferring the remainder of the single wavelength light beam,
a wavelength division multiplexer (42) in electromagnetic communication with said laser light source (22) through said plurality of first fiber-optic cables (32) and said plurality of second division fiber-optic cables (40) for combining the remaining fraction of each of the single wavelength light beams into a combination light beam,
an input fiber-optic cable (44) connecting to said wavelength division multiplexer (42) for transmitting the combination light beam,
a circulator (46) including a first port (48) a second port (50) and a third port (52) and said first port (48) being connected to said input fiber-optic cable (44) for receiving the combination light beam and transmitting the combination light beam to said second port (50),
a two-way fiber-optic cable (54) in electromagnetic communication with said laser light source (22) extending from said second port (50) to a distal end (56) defining an outward direction from said second port (50) to said distal end (56) and defining an inward direction from said distal end (56) to said second port (50) for transmitting the combination light beam between said circulator (46) and said distal end (56), said distal end (56) of said two-way fiber-optic cable (54) for discharging the combination light beam including each of the single wavelength light beams about a center of a projection C, a collimating lens (58) spaced from said distal end (56) along said center of projection C at a first distance D, said collimating lens (58) comprising a first side (60) spaced from a second side (62) defining a thickness T with said first side (60) facing towards said distal end (56) and said second side (62) facing away from said distal end (56), said first side (60) of said collimating lens (58) defining a first radius of curvature (64) and said collimating lens (58) aligning the combination light beam into a parallel relationship about said center of projection C and sending the combination light beam entering from said first side (60) of said collimating lens (58), a mirror (66) including a center point (68) extending to a peripheral edge (70) defining a circular shape being spaced along said center of projection C from said collimating lens (58) a second distance B when said mirror (66) being in a rested position (72), said peripheral edge (70) of said mirror (66) defining a circular shape and said center point (68) of said mirror (66) receiving said center of projection C of the combination light beam from said collimating lens (58) with said mirror (66) reflecting a larger fraction of the combination light beam projected with a Gaussian profile back onto said collimating lens (58) as said mirror (66) being displaced from said rested position (72) towards said collimating lens (58) along the center of projection C, said second side (62) of said collimating lens (58) having a second radius of curvature (74) and said collimating lens (58) including a focal point at said first distance D along said center of projection C for focusing the reflected combination light beam into said distal end (56) of said two-way fiber-optic cable (54) in the inward direction to said second port (50), a connector (76) comprising material non-reflective to the combination light beam including a rigid portion (78) and a flexible portion (80) with said rigid portion (78) statically connecting said distal end (56) of said two-way fiber-optic cable (54) to said collimating lens (58) and said flexible portion (80) elastically connecting said collimating lens (58) directly to said mirror (66) and biasing said mirror (66) in said rested position (72), said flexible portion (80) of said connector (76) having a defined transverse stiffness K in a first dimension of applied force X and a second dimension of applied force V and a defined axial stiffness L in a third dimension of applied force Z for allowing deformation of said flexible portion (80) and outside forces acting upon said mirror (66) deforming said flexible portion (80) of said connector (76) and changing the alignment of said mirror (66) with said center of projection C and changing the fraction of the combination light beam reflected back to said two-way fiber-optic cable (54) through said collimating lens (58), a reflected light fiber-optic cable (82) extending from said third port (52) of said circulator (46) for transmitting the reflected combination light beam traveling from said two-way fiber-optic cable (54) in the inward direction through said second port (50), an array waveguide grating demultiplexer (84) in electromagnetic communication with said circulator (46) through said reflected light fiber-optic cable (82) for separating the reflected combination light beam back into the single wavelength light beams for measuring the radiant flux of each single wavelength light beams reflected from said mirror (66), a plurality of second fiber-optic cables (86) extending from said array waveguide grating demultiplexer (84) with each of said second fiber-optic cables (86) transmitting one of the single wavelength light beams from said array waveguide grating demultiplexer (84), a plurality of final photodiodes (88) in electromagnetic communication with said array waveguide grating demultiplexer (84) with each of said final photodiodes (88) connected and paired to one of said second fiber-optic cables (86) for measuring and converting the radiant flux of the single wavelength light beams into a current which can be aggregated for calculating displacement along said third dimension of applied force Z as a function of the change of radiant flux between said first photodiode (38) and said final photodiode (88) that increases in proportion as said mirror (66) being displaced from said rested position (72) towards said collimating lens (58) thereby reflecting more of the reflected combination light beam back into said collimating lens (58), and characterized by, said mirror (66) including a plurality of sectors (90, 92, 94, 96) extending from said center point (68) to said peripheral edge (70) and each of said sectors (90, 92, 94, 96) being equal in size and shape and defining an equal ratio of said mirror (66) for reflecting an equal amount of the projection of the combination light beam when said mirror (66) being in said rested position (72), each of said sectors (90, 92, 94, 96) of said mirror (66) comprising a substrate and at least one layer of optical coating (98) having a reflectance corresponding to one of the single wavelength light beams transmitted from said laser light source (22) for reflecting only single wavelength light beams in the combination light beam having a matched wavelength to the reflectance and said plurality of final photodiodes (88) receiving and measuring the radiant flux of each one of the single wavelength light beams and calculating the transverse displacement along said first dimension of applied force X said second dimension of applied force V and said third dimension of applied force Z as a function of the change of the radiant flux between each of the single wavelength light beams changing as the area of each of said sectors (90, 92, 94, 96) are displaced towards and away from said center of projection C by elastic deformation of said flexible portion (80) of said connector (76) and forces acting upon said mirror (66) becomes a function of the displacement of said mirror (66) and said transverse stiffness K and said axial stiffness L, said plurality of sectors (90, 92, 94, 96) further comprising a first sector (90) having a high reflectance only for the light beam having a wavelength$\lambda_1$ from said first channel (24) of said laser light source (22) and a second sector (92) having a high reflectance only for the light beam having a wavelength $\lambda_2$ from said second channel (26) of said laser light source (22) and a third sector (94) having a high reflectance only for the light beam having a wavelength $\lambda_3$ from said third channel (28) of said laser light source (22) and a forth sector (96)

having a high reflectance only for the light beam having a wavelength $\lambda_4$ from said forth channel of said laser light source (22).

11. A method for measuring force and displacement of a fiber-optic sensor (20) comprising a mirror (66) with a plurality of sectors (90, 92, 94, 96) extending from a center point (68) to a peripheral edge (70) with each of said sectors (90, 92, 94, 96) having a different reflectance and said mirror (66) being biased in a rested position (72) along a center of a projection C of a combination light beam by a connector (76) having a flexible portion (80) elastically connecting a collimating lens (58) directly to said mirror and said method including the steps of
producing a plurality of single wavelength light beams having different wavelengths,
projecting a combination light beam that includes each single wavelength light beam about the center of projection C,
organizing and aligning the rays of the combination light beamparallel relationship and casting the aligned rays of the combination light beam,
biasing the mirror (66) in the rested position (72) with the connector (76),
and characterized by,
reflecting only one wavelength of the combination light beam per sector (90, 92, 94, 96) of the mirror (66),
measuring displacement of the mirror (66) as a function of the radiant flux between each of the single wavelength light beams changing as the area of each of the sectors (90, 92, 94, 96) are displaced towards and away from the center of projection C by deformation of the flexible portion (80) of the connector (76).

12. A method as set forth in claim 11 further including reflecting equal portions of the combination light beam from the mirror (66) with each sector (90, 92, 94, 96) of the mirror (66) when the mirror (66) being in the rested position (72).

13. A method as set forth in claim 12 further including reflecting four different wavelengths comprising a first light beam having wavelength $\lambda_1$ with a first sector (90) and reflecting a second light beam having a wavelength $\lambda_2$ with a second sector (92) and reflecting a third light beam having a wavelength $\lambda_3$ with a third sector (94) and reflecting a forth light beam having a wavelength $\lambda_4$ with a forth sector (96).

14. A method as set forth in claim 13 further including applying outside forces on the flexible portion (80) of the connector (76) having a transverse stiffness K in a first dimension of applied force X and a second dimension of applied force Y and a axial stiffness L in a third dimension of applied force Z allowing deformation of the flexible portion (80) for changing the alignment of the mirror (66) with the center of projection C thereby changing the fraction of the combination light beam reflected.

15. A method as set forth in claim 14 further including measuring the transverse displacement along the first dimension of applied force X and the second dimension of applied force V and the third dimension of applied force Z as a function of the change of the radiant flux between each of the single wavelength light beams changing as the area of each of the sectors (90, 92, 94, 96) are displaced towards and away from the center of projection C by deformation of the flexible portion (80) of the connector (76).

16. A method as set forth in claim 15 further including measuring a force acting upon the mirror (66) as a function of the displacement of the mirror (66) and the transverse stiffness K and the axial stiffness L of the flexible portion of the connector (76).

17. A method as set forth in claim 16 further including returning the reflected combination light beam from the mirror (66) back to the collimating lens (58) with the mirror (66) reflecting a larger fraction of the combination light beam projected with a Gaussian profile back onto the collimating lens (58) as the mirror (66) moves closer to the collimating lens (58).

18. A method as set forth in claim 17 further including focusing the reflected combination light beam along the center of projection C back into the distal end (56) of the two-way fiber-optic cable (54) with the collimating lens (58).

19. A method as set forth in claim 18 further including a step of separating the reflected combination light beam back into separate single wavelength light beams with the array waveguide grating demultiplexor (84) and measuring the radiant flux of each single wavelength light beams with a final photodiode (88).

20. A method for measuring force and displacement of a fiber-optic sensor (20) comprising a mirror (66) with a plurality of sectors (90, 92, 94, 96) extending from a center point (68) to a peripheral edge (70) with each of said sectors (90, 92, 94, 96) having a different reflectance and said mirror (66) being biased in a rested position (72) along a center of a projection C of a combination light beam by a connector (76) having a flexible portion (80) and said method including the steps of;
producing a plurality of single wavelength light beams with a laser light source (22) with each of the single wavelength light beams having a different wavelength,
said step of producing a plurality of single wavelength light beams at different wavelengths including producing a first light beam having a wavelength $\lambda_1$ a second light beam having a wavelength $\lambda_2$ a third light beam having a wavelength $\lambda_3$ and a forth light beam having a wavelength $\lambda_4$,
dividing each of the single wavelength light beams with a power splitter (34) into a predefined first fraction of the single wavelength light beam and a predefined second fraction of the single wavelength light beam,
monitoring the radiant flux of the first fraction of each of the single wavelength light beams,
said step of monitoring the radiant flux of the first fraction of each of the single wavelength light beams further including converting the radiant flux into a current with a first photodiode (38),
merging each of the second fractions of the single wavelength light beams into a combination light beam with a multiplexor (42),
transmitting the combination light beam to a circulator (46) that includes a first port (48) a second port (50) and a third port (52),
directing the combination light beam from the first port (48) to the second port (50) of he circulator (46),
transmitting the combination light beam from the second port (50) of the circulator (46) along a two-way fiber-optic cable (54) extending from the second port (50) to a distal end (56),
projecting the combination light beam about a center of projection C from the distal end (56) to a collimating lens (58) being spaced from the distal end (56) a first distance D,
organizing and aligning the rays of the combination light beam into a parallel relationship with the collimating lens (58) and casting the aligned rays of the combination light beam onto a mirror (66) including a center point (68) extending to a peripheral edge (70) defining a circular shape being spaced along the center of projection C from the collimating lens (58) a second distance B when the mirror (66) being in a rested position (72), biasing the mirror (66) in the rested position (72) with a connector (76) comprising material non-reflective to the combination light beam including a rigid portion (78) and a flexible portion (80) and statically connecting the distal end (56) of the two-way fiber-optic cable (54) to the collimating lens (58) with the rigid portion (78) and elastically connecting the collimating lens (58) directly to the mirror (66) with the flexible portion (80) of the connector (76) having a transverse stiffness K in a first dimension of applied force X and a second dimension of applied force Y and a axial stiffness L in a third dimension of applied force Z for allowing deformation of the flexible portion (80) when outside forces acting upon the mirror (66) for changing the alignment of the mirror (66) with the center of projection C thereby changing the fraction of the combination light beam reflected back to the two-way fiber-optic cable (54) through the collimating lens (58), receiving and returning the reflected combination light beam from the mirror (66) back to the collimating lens (58) with the mirror (66) reflecting a larger fraction of the combination light beam projected with a Gaussian profile back onto the collimating lens (58) as the mirror (66) moves closer to the collimating lens (58), focusing the reflected combination light beam along the center of projection C back into the distal end (56) of the two-way fiber-optic cable (54) with the collimating lens (58), transmitting the reflected combination light beam back through the second port (50) of the circulator (46) and directing the reflected combination light beam to the third port (52) of the circulator (46), transmitting the reflected combination light beam from the third port (52) of the circulator (46) to an array waveguide grating demultiplexor (84), separating the reflected combination light beam back into separate single wavelength light beams with the array waveguide grating demultiplexor (84), measuring the radiant flux of each single wavelength light beams, said step of measuring the radiant flux of single wavelength light beams further including converting the radiant flux of each single wavelength light beam into a current with a plurality of final photodiodes (88) and aggregating each current, measuring displacement along the third dimension of applied force Z as a function of the change of radiant flux between the aggregated single light beams from the laser light source (22) and the aggregated single wavelength light beams separated from the array waveguide grating demultiplexor (84) that increases in proportion to the mirror (66) being displaced from the rested position (72) towards the collimating lens (58) thereby reflecting more of the reflected combination light beam back into the collimating lens (58), said step of measuring displacement along the third dimension of applied force Z including monitoring the radiant flux from the first photodiode (38) and measuring the radiant flux from the final photodiode (88), and characterized by, said step of receiving and returning the reflected combination light beam from the mirror (66) back to the collimating lens (58) further including reflecting only one wavelength per a sector (90, 92, 94, 96) in a plurality of sectors (90, 92, 94, 96) of the mirror (66), said step of reflecting only one wavelength with each sector (90, 92, 94, 96) of the mirror (66) further including reflecting a first light beam having wavelength $\lambda_1$ with a first sector (90) and reflecting a second light beam having a wavelength $\lambda_2$ with a second sector (92) and reflecting a third light beam having a wavelength $\lambda_3$ with a third sector (94) and reflecting a forth light beam having a wavelength $\lambda_4$ with a forth sector (96), receiving and measuring the radiant flux of each one of the single wavelength light beams, measuring the transverse displacement along the first dimension of applied force X and the second dimension of applied force Y as a function of change of the radiant flux between each of the single wavelength light beams changing as the area of each of the sectors (90, 92, 94, 96) are displaced towards and away from the center of projection C by deformation of the flexible portion (80) of the connector (76) in the first dimension of applied force X and the second dimension of applied force Y, measuring a force acting upon the mirror (66) as a function of the displacement of the mirror (66) and the transverse stiffness K and the axial stiffness L.

* * * * *